United States Patent
Alavez Sosa et al.

(10) Patent No.: US 12,158,870 B1
(45) Date of Patent: Dec. 3, 2024

(54) HETEROGENEOUS XML DOCUMENT SUPPORT IN A SHARDED DATABASE

(71) Applicant: Oracle International Corporation, Redwood Shores, CA (US)

(72) Inventors: Francisco Alonso Alavez Sosa, Zapopan (MX); Jose Omar Alvizo Flores, Foster City, CA (US); Rodrigo Fuentes Hernandez, Redwood City, CA (US); Alfonso Colunga Sosa, Redwood City, CA (US); Tixtla Iñaqui Medina Julia, Zapopan (MX); Zhen Hua Liu, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/373,218

(22) Filed: Sep. 26, 2023

(51) Int. Cl.
*G06F 16/00* (2019.01)
*G06F 16/22* (2019.01)
*G06F 16/242* (2019.01)
*G06F 16/25* (2019.01)

(52) U.S. Cl.
CPC ...... *G06F 16/2219* (2019.01); *G06F 16/2282* (2019.01); *G06F 16/2433* (2019.01); *G06F 16/258* (2019.01)

(58) Field of Classification Search
CPC .............. G06F 16/2219; G06F 16/2282; G06F 16/2433; G06F 16/258
See application file for complete search history.

(56) References Cited

U.S. PATENT DOCUMENTS

| | | | | |
|---|---|---|---|---|
| 5,999,943 | A * | 12/1999 | Nori | G06F 16/2246 |
| 11,036,762 | B1 * | 6/2021 | Bruck | G06F 16/278 |
| 2004/0220946 | A1 * | 11/2004 | Krishnaprasad | G06F 16/88 |
| 2005/0138047 | A1 * | 6/2005 | Liu | G06F 16/88 |
| 2006/0075006 | A1 * | 4/2006 | Yu | G06F 16/2219 |
| 2007/0239681 | A1 * | 10/2007 | Krishnaprasad | G06F 16/81 |
| 2008/0005093 | A1 * | 1/2008 | Liu | G06F 16/86 |
| 2008/0243945 | A1 * | 10/2008 | Hanus | G06F 16/2219 |
| 2010/0017429 | A1 * | 1/2010 | Cox | G06F 16/278 |
| 2012/0110572 | A1 * | 5/2012 | Kodi | G06F 9/45558 718/1 |
| 2013/0006940 | A1 * | 1/2013 | Garza | G06F 16/00 707/648 |
| 2016/0306854 | A1 * | 10/2016 | Hegde | G06F 16/24552 |
| 2017/0017683 | A1 * | 1/2017 | Fourny | G06F 16/22 |
| 2017/0060973 | A1 * | 3/2017 | Liu | G06F 16/86 |

(Continued)

*Primary Examiner* — Noosha Arjomandi
(74) *Attorney, Agent, or Firm* — Hickman Becker Bingham Ledesma LLP; Stephen R. Tkacs (57) ABSTRACT

When a coordinator of a sharded DBMS receives from a client a query that has an XML operator that references a column in a sharded table and returns an XML image having an XML image type, then the coordinator issues a remote query that uses a new operator to ensure that the shard returns a TBX BLOB having a TBX type. In response to receiving the remote query with the new operator, each shard extracts a binary large object (BLOB) out of the XML image at the shard and returns the TBX BLOB data to the coordinator. In addition, the sharded DBMS provides a make-XML operator that the coordinator uses to work with the TBX BLOB received from each shard and recreate an XML type image, which is the result that the client expects.

20 Claims, 5 Drawing Sheets

(56) References Cited

U.S. PATENT DOCUMENTS

| | | | |
|---|---|---|---|
| 2017/0103116 A1* | 4/2017 | Hu | G06F 16/2471 |
| 2018/0060362 A1* | 3/2018 | Chidambaran | G06F 16/2282 |
| 2019/0102476 A1* | 4/2019 | Liu | G06F 16/30 |
| 2021/0073208 A1* | 3/2021 | Wong | G06F 16/2379 |
| 2021/0081378 A1* | 3/2021 | Hu | G06F 16/211 |
| 2023/0359618 A1* | 11/2023 | Krishna | A63F 13/352 |
| 2024/0070135 A1* | 2/2024 | Ou | G06F 16/2228 |

* cited by examiner

HETEROGENEOUS XML DOCUMENT SUPPORT IN A SHARDED DATABASE

FIELD OF THE INVENTION

The present invention relates to techniques for heterogeneous eXtensible Markup Language (XML) document support in a sharded database and, more particularly, to techniques to manipulate, query, and generate XML documents in a sharded database management system.

BACKGROUND

Extensible Markup Language (XML) is a markup language and file format for storing, transmitting, and reconstructing data. XML defines a set of rules for encoding documents such that they are both human-readable and machine-readable. In database management systems (DBMSs), XMLType is designated as a system-defined opaque data type for handling XML data. Database tables can have columns of XMLType into which XML documents can be inserted. In some implementations, a DBMS stores XML data as a binary large object (LOB or BLOB) to store the original XML data and a number of member functions to make the data available to structured query language (SQL) operators.

Sharding distributes segments of a data set across multiple database servers, referred to as "shards," on different computers, on premises, or in the cloud. Sharding enables globally distributed, linearly scalable, multimodal databases. Sharding provides strong consistency, the full power of SQL, and support for structured and unstructured data. Some of the large customers that require the performance and architecture of sharding also happen to be older companies that had based their applications on older standards and had developed whole databases using what was new at the time, which, in many cases, was XML.

Currently, the use of XML data types in a sharded DBMS is limited to each XML LOB being stored in a single shard server. In current implementations, there is no support for sharded XML tables due to certain limitations. A main limitation is that sharded database management systems do not support opaque data types to be propagated over the shards and have only limited support of large objects (LOBs). Thus, because XMLType is designated as an opaque data type and there is a LOB underneath, the result is a performance issue and incomplete sharding functionality, impeding the distributed principle of allowing each shard to make its own part of the whole work.

Another limitation, which is no less important, is that XMLType has a centralized architecture. An XML data object is not self-contained, and the DBMS requires a centralized XML token dictionary to interpret the binary data in any XML object in the database. This makes it unfeasible to maintain the XMLType across different database servers, such as shards, remotely.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments store XML data in a transportable binary XML (TBX) storage type, which is a self-contained binary format. This allows XML type documents to be transported across shards of a sharded DBMS. The TBX format allows manipulation, query, and XML generation across a sharded environment. The illustrative embodiments also enhance various operators to return XML data in a TBX type, which is data type formatted in the TBX format.

The illustrative embodiments also provide a new operator that is used with an XML operator when being pushed down to each shard as a remote query. The new operator returns TBX typed XML data. If a coordinator of a sharded DBMS receives from a client a query that has an XML operator that references a column in a sharded table and returns an XML image having an XML image type (a type for passing XML data between operators and functions), then the coordinator issues a remote query that uses the new operator to ensure that the shard returns a TBX binary large object (BLOB) having a TBX type. The coordinator generates the new operator in flight in response to detecting a query with an operator that will return XML type data. In response to receiving the remote query with the new operator, each shard extracts a BLOB out of a sharded table and applies an XML operator to the BLOB, which returns an XML image to the new operator, and the new operator returns a TBX BLOB to the coordinator. This ensures that XML data that is distributed across shards in a sharded DBMS can be queried by the shard and that results can be returned by the shards in a supported self-contained format.

In addition, the illustrative embodiments provide a new make-XML operator that the coordinator uses to work with the TBX BLOB received from each shard and recreate an XML type image, which is the result that the client expects. The remote query that is issued to each shard by the coordinator references the make-XML operator, which indicates that upon receiving TBX BLOB data from each shard, the coordinator is to convert the TBX BLOB into an XML type image.

Transportable Binary Xml

Different applications use XML data in different ways. Sometimes XML data is constructed from relational data sources, so it is relatively structured. Sometimes XML data is used for extraction, transformation, and loading (ETL) operations, in which case it is also quite structured. Sometimes it is used for free-form documents (unstructured or semi-structured) such as books and articles. Because there is a broad spectrum of XML usage, there is no one-size-fits-all storage model that offers optimal performance and flexibility for every use case.

Compact Schema-aware Binary XML (CSX) storage is a storage model for XML data. CSX is a post-parse, binary format designed specifically for XML data. Binary XML is compact and XML schema aware. This is also referred to as post-parse persistence. The biggest advantage of Binary XML storage is flexibility: it can be used for XML schema-based documents or for documents that are not based on an XML schema. Binary XML storage can be used with an XML schema that allows for high data variability or that evolves considerably or unexpectedly. This storage model also provides efficient partial updating and streamable query evaluation.

Transportable Binary XML (TBX) storage is a variant built on top of compact schema-aware Binary XML (CSX) with inline token information. TBX is scalable and supports sharding, data replication, and search indexing. In current implementations, a user can create sharded tables with TBX columns but not sharded TBX tables, and virtual TBX columns can be created in sharded tables, but they cannot be a sharded key.

TBX is a self-contained binary format. Self-contained means, inter alia, that an object, such as BLOB, that stores an XML document or fragment is encoded according to one or more dictionaries stored in the object. A dictionary maps XML element names and/or values to codes (e.g. integer codes). There may be multiple dictionaries in an object, one for element names and one for element values. An example of a self-contained format is described in U.S. application Ser. No. 14/836,680, filed Aug. 26, 2015, now U.S. Pat. No. 10,262,012, which is incorporated herein by reference. While this application describes a self-contained format for JSON, the techniques are applicable to other forms of mark-up languages, such as XML.

Because TBX is the only way XMLType documents can be transported across shards, this format is the default XML format in the illustrative embodiments and the only XML format allowed in a sharded DBMS. In accordance with the illustrative embodiments, the DBMS is enhanced to allow manipulation, query, and generation of XML across a sharded environment, and all existing operators are enhanced to return TBX.

Partitioning XML in a Sharded DBMS

Sharding is a method of partitioning data to distribute the computational and storage workload, which helps in achieving hyperscale computing. Hyperscale computing is a computing architecture that can scale up or down quickly to meet actual demand on the system. Sharding is a "shared-nothing" architecture in which shards share no hardware or software. All of the shards together make up a single logical DBMS, called a sharded DBMS.

Figure 1:
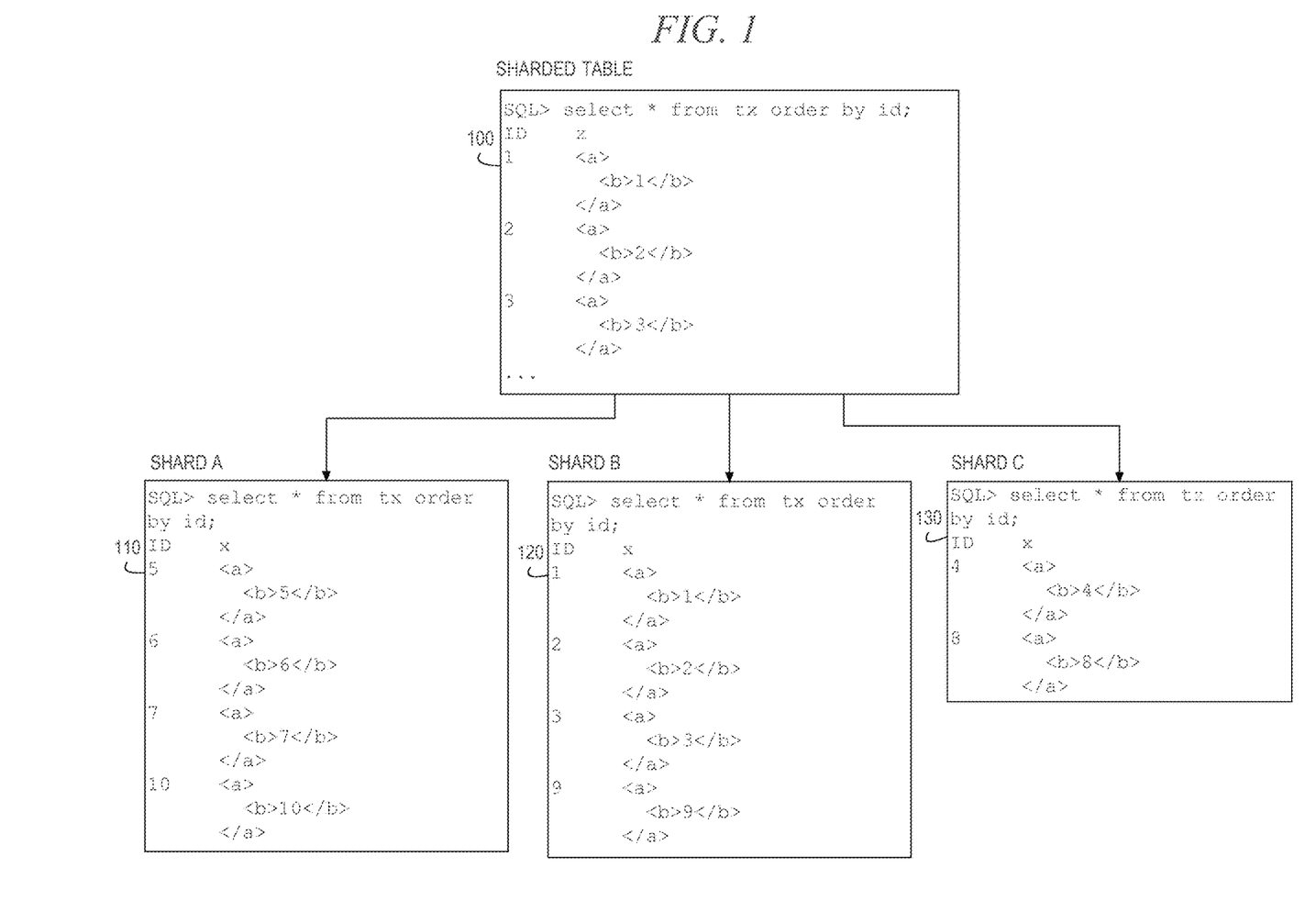
FIG. 1 depicts a logical view of a sharded XML table and its physical implementation in accordance with an illustrative embodiment.

In accordance with an illustrative embodiment, the DBMS is enhanced to allow creation of a sharded XML table. For example, the following command may be issued to create a sharded XML table:

create sharded table tx(id number, x xmltype, constraint shpk primary key(id)) partition by consistent hash(id) partitions auto tablespace set tbsset1;

FIG. 1 depicts a logical view of a sharded XML table and its physical implementation in accordance with an illustrative embodiment. In the example shown in FIG. 1, XML table 100 includes 10 rows and is distributed among shard A, shard B, and shard C as table partitions 110, 120, 130. In the depicted example, shard A stores rows 5, 6, 7, and 10 in partition 110, shard B stores rows 1, 2, 3, and 9 in partition 120, and shard C stores rows 4 and 8 in partition 130.

From the perspective of the application at client 101, a sharded database looks like a single database. That is, the rows of the XML table distributed among shard A, shard B, and shard C, i.e., XML table partitions 110, 120, 130, appear to the client 101 as a single XML table 100. The number of shards and the distribution of data across those shards are completely transparent to client 101. Thus, in accordance with the illustrative embodiment, sharding automatically distributes the XML partitions across shards when the "CREATE SHARDED TABLE" statement is issued, despite the table being an XML table, and the distribution of partitions 110, 120, 130 is transparent to client 101.

Sharding of XML tables provides benefits including linear scalability, extreme availability and fault isolation, and geographical distribution of data. The sharding shared-nothing architecture eliminates performance bottlenecks and provides virtually unlimited scalability. Also, single points of failure are eliminated because shards do not share resources, such as software, CPU, memory, or storage devices. The failure or slow-down of one shard does not affect the performance or availability of other shards. An unplanned outage or planned maintenance of a shard impacts only the availability of the data on that shard; therefore, only the users of that small portion of the data are affected, for example during a failover brownout. Furthermore, sharding enables global database implementations, where a single logical database could be distributed over multiple geographies. This makes it possible to satisfy data privacy regulatory requirements (Data Sovereignty) and allow storage of particular data close to its consumers (Data Proximity).

XML Queries in Sharded DBMS

In a sharded DBMS, the main principle of work distribution is compiled by the coordinator, and depending on this, shards will execute and return what the coordinator requested. To maximize performance and get as much work distributed as possible, the coordinator must generate a remote query that all shards execute. Depending on how much of the original query gets "pushed down" into the remote query issued from the coordinator to the shard servers, the result from each shard is processed in the coordinator to return a result that the client expects. In other words, the coordinator receives a query from the client, issues remote queries to the shards, processes results received from the shards, and returns the results to the client.

Because XMLType is designated as an opaque type and cannot be pushed down to the shards, the DBMS must work with the BLOB underneath the XMLType data in the shards, which can be transported. Nevertheless, the coordinator cannot push the original query down into the shards and the distributed principle of the sharded DBMS environment is limited. To address the limitation of the opaque type, the illustrative embodiment provides a new operator that is generated internally in the coordinator in flight whenever the coordinator detects a query having an operator that returns XMLType data. This new operator forms a TBX BLOB out of the XMLImage at the shard and returns the TBX BLOB to the coordinator.

Figure 2A:
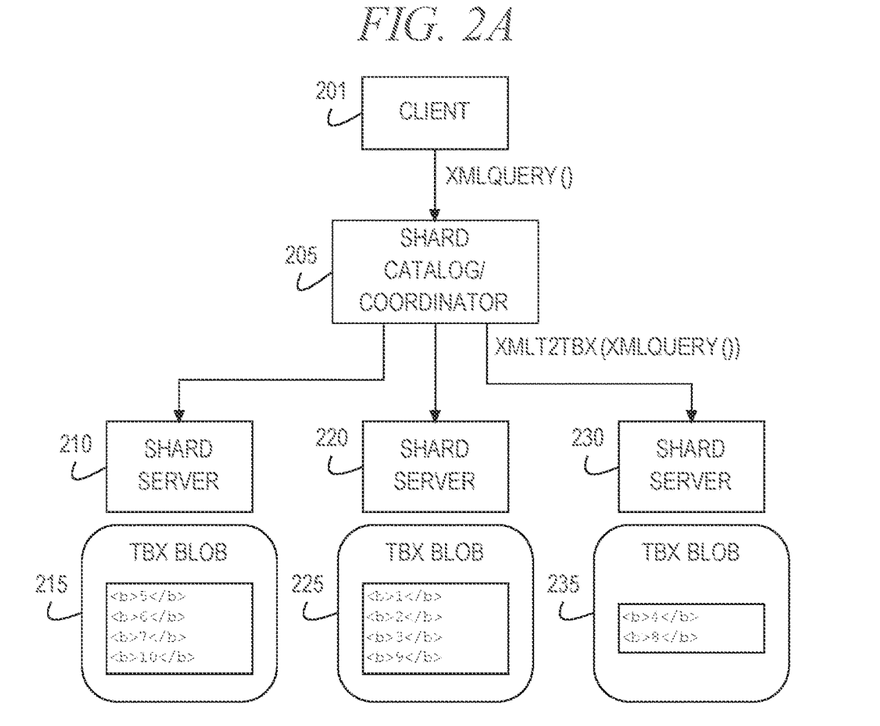
FIG. 2A is a block diagram illustrating a sharded DBMS processing an XML query in accordance with an illustrative embodiment.

FIG. 2A is a block diagram illustrating a sharded DBMS processing an XML query in accordance with an illustrative embodiment. Client 201 sends a query with an XML operator, XMLQUERY ( ), to shard catalog/coordinator 205 to search an XML table that is distributed to shards 210, 220, 230 as TBX BLOBs 215, 225, 235. The TBX BLOBs 215, 225, 235 are stored in the TBX format, meaning they are scalable, self-contained, and support sharding, TBX data replication, and search indexing. That is, the XML data in TBX BLOBs 215, 225, 235 can be searched using an XML operator, and the results can be returned from shards 210, 220, 230 to coordinator 205. Coordinator 205 detects that the query includes an XML operator that returns XMLType data. Coordinator 205 then uses an XML-type-to-TBX operator, XMLT2TBX ( ), to issue the request to shards 210, 220, 230. The XML-type-to-TBX operator ensures that shards 210, 220, 230 return all XMLType data as a valid TBX BLOB.

As an example, consider the following query:
SELECT XMLQUERY('/A/B' PASSING X RETURNING CONTENT) FROM TX;

In this query, XMLQUERY ( ) is an XML operator. The PASSING clause is an expression returning an XMLType or an instance of a SQL scalar data type that is used as the context for evaluating the XMLQUERY expression. In this case, X is the XML table that is partitioned across shards 210, 220, 230. The RETURNING CONTENT expression indicates that the result from the query evaluation is either an XML document or an XML document fragment. The coordinator uses the XML-type-to-TBX operator to push the XML operator to the shards as follows:
SYS_XMLT2TBX(XMLQUERY('/a/b' PASSING BY VALUE
SYS MAKEXML(FORMAT, "SHTBX"."COLUMN") RETURNING CONTENT))

This remote query uses the XMLT2 TBX ( ) operator to push the XMLQUERY ( ) expression to the shards 210, 220, 230. The MAKEXML ( ) operator is used by the coordinator to work with the returning TBX BLOB received from each shard and to recreate an XMLType image, which is the result that the client expects. Within the MAKEXML ( ) operator, FORMAT represents the format of the column containing the TBX BLOB, SHTBX represents the sharded TBX table, and COLUMN is the column containing the TBX BLOB with the XML. The MAKEXML ( ) operator returns an XML image. The process of converting the TBX BLOB returned by each shard into an XML image is described in further detail below.

There are some operators that return XMLType data. These operators were developed based on non-transportable binary XML. The illustrative embodiment provides a way within the XML-type-to-TBX operator to encode the XML document into a TBX format. This way, XMLType operators, both XML generation and XML queries, work with only one format and can be pushed down to all the shards.

Figure 2B:
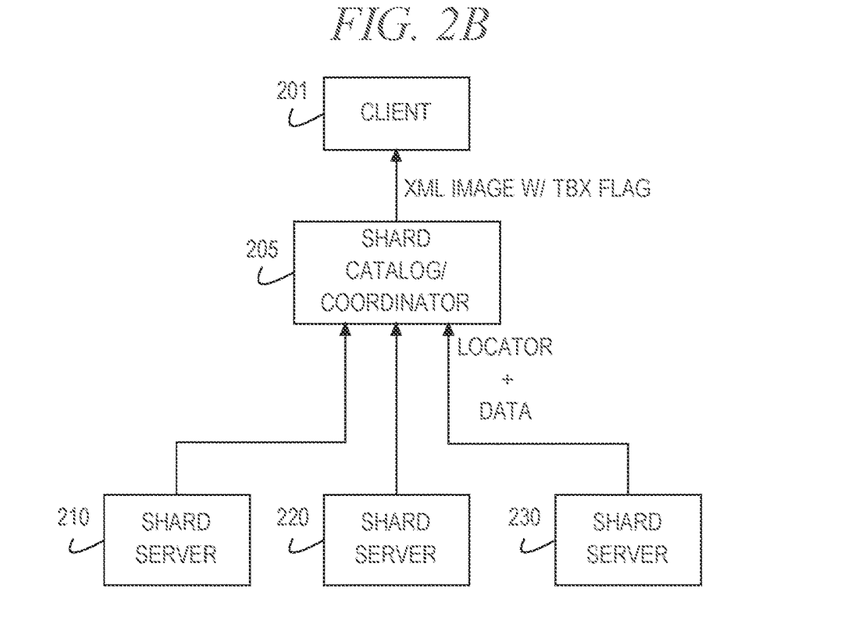
FIG. 2B is a block diagram illustrating shards in a sharded DBMS returning results of an XML query in accordance with an illustrative embodiment.

FIG. 2B is a block diagram illustrating shards in a sharded DBMS returning results of an XML query in accordance with an illustrative embodiment. In response to the XML-type-to-TBX operator, each shard 210, 220, 230 executes the XML operator on its partition of the XML table. Each shard creates a TBX BLOB from the XML image and returns it to coordinator 205.

In some embodiments, each shard 210, 220, 230 returns its TBX BLOB as a locator and data. In the value-based LOB infrastructure, a LOB instance has a locator and a value. A LOB locator is a reference, or pointer, to where the LOB value is physically stored. The LOB value is the data stored in the LOB. A LOB locator can be assigned to any LOB instance of the same type, such as BLOB. In these embodiments, the shards and coordinator leverage the existing value-based LOB infrastructure by creating a dummy locator that identifies the shard and indicates an amount of data in the TBX BLOB to be transferred from the shard to the coordinator. For each locator the coordinator receives, the coordinator creates a temporary LOB and writes the data received from the shard into the temporary LOB. When all data has been written, as indicated by the amount of data indicated in the locator, coordinator 105 then executes the make-XML operator, MAKEXML ( ), on the temporary LOB and creates an XML image to be returned to client 201. Thus, for each shard, the coordinator receives a locator and data, creates a temporary LOB, executes the make-XML operator on the temporary LOB, creates an XML image from the temporary LOB, and returns the XML image to the client.

Procedural Overview

Figure 3:
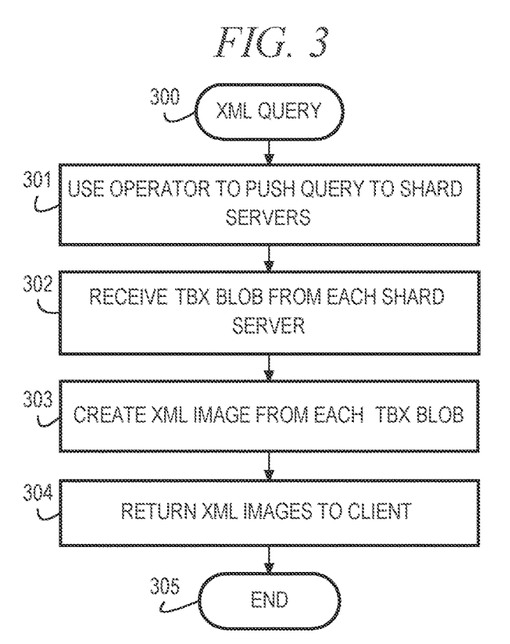
FIG. 3 is a flowchart illustrating operation of a coordinator processing a query with an XML operator in accordance with an illustrative embodiment.

FIG. 3 is a flowchart illustrating operation of a coordinator processing a query with an XML operator in accordance with an illustrative embodiment. Operation begins when the coordinator receives a query with an XML operator (block 300) for accessing an XML table distributed across a plurality of shard servers. The coordinator uses an XML-type-to-TBX operator to push the query to the shard servers (block 301). The coordinator then receives a TBX BLOB from each shard server (block 302) and creates an XML image from each TBX BLOB (block 303). The process of receiving a TBX BLOB and creating an XML image is described in further detail below with reference to FIG. 5. The coordinator then returns the XML images to the client (block 304), and operation ends (block 305).

Figure 4:
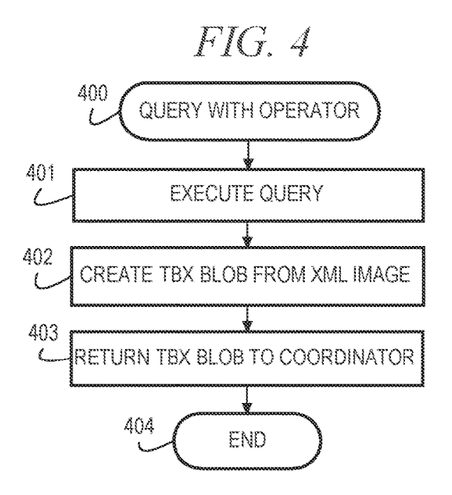
FIG. 4 is a flowchart illustrating operation of a shard processing a remote query with an XML-type-to-TBX operator in accordance with an illustrative embodiment.

FIG. 4 is a flowchart illustrating operation of a shard processing a remote query with an XML-type-to-TBX operator in accordance with an illustrative embodiment. Operation begins when the shard receives a remote query with an XML-type-to-TBX operator (block 400). The shard executes the query on its partition of the XML table (block 401). The shard extracts a BLOB out of its partition of the sharded table and applies an XML operator to the BLOB, which returns an XML image to the XML-type-to-TBX operator (block 402). The shard then applies the XML-type-to-TBX operator to create the TBX BLOB and returns it to the coordinator (block 403). Thereafter, operation ends (block 404).

Figure 5:
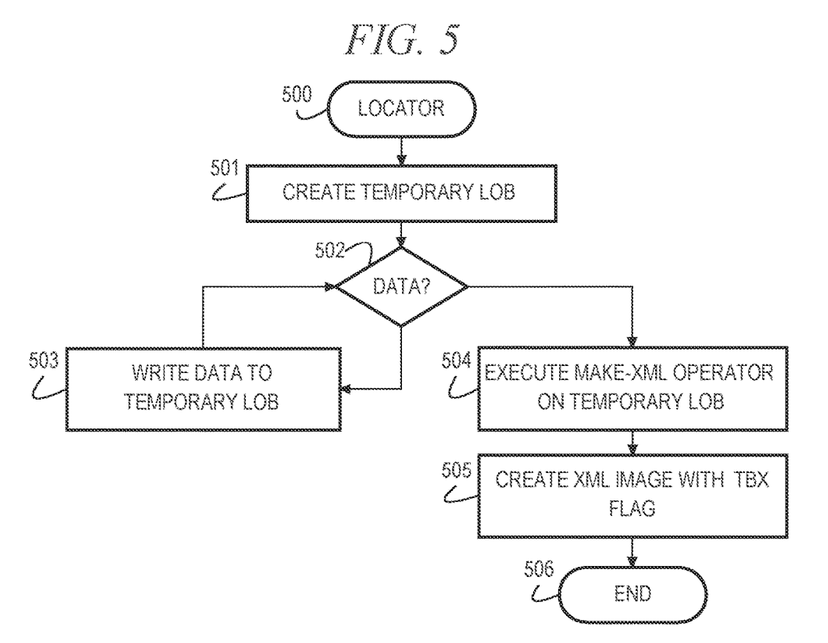
FIG. 5 is a flowchart illustrating operation of a coordinator creating an XML image from data received from a shard in accordance with an illustrative embodiment.

FIG. 5 is a flowchart illustrating operation of a coordinator creating an XML image from data received from a shard in accordance with an illustrative embodiment. Operation begins when the coordinator receives a locator from a shard (block 500). As described above, the locator is a dummy locator that identifies the shard and indicates an amount of data being returned in the TBX BLOB. The coordinator creates a temporary LOB (block 501) and determines whether there is data to be received from the shard (block 502). The coordinator determines whether there is data to be received by comparing an amount of data already received and the amount of data indicated in the locator, for example. If there is data to be received (block 502: YES), then the coordinator writes received data to the temporary LOB (block 503) and operation returns to block 502 to determine whether there is still data to be received. If there is no more data to be received (block 502:NO), then the coordinator executes the make-XML operator on the temporary LOB (block 504) and creates an XML image with the TBX flag (block 505). Thereafter, operation ends (block 506).

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., .java file) and the compiled version of the class (i.e., class file).

A database object may have an attribute that is a primary key. A primary key contains primary key values. A primary key value uniquely identifies a record among the records in the database object. For example, a database table may include a column that is a primary key. Each row in the database table holds a primary key value that uniquely identifies the row among the rows in the database table.

A database object may have an attribute that is a foreign key of a primary key of another database object. A foreign key of a primary key contains primary key values of the primary key. Thus, a foreign key value in the foreign key uniquely identifies a record in the respective database object of the primary key.

A foreign key constraint based on a primary key may be defined for a foreign key. A DBMS ensures that any value in the foreign key exists in the primary key. A foreign key need not be defined for a foreign key. Instead, a foreign key relationship may be defined for the foreign key. Applications that populate the foreign key are configured to ensure that foreign key values in the foreign key exist in the respective primary. An application may maintain a foreign key in this way even when no foreign relationship is defined for the foreign key.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
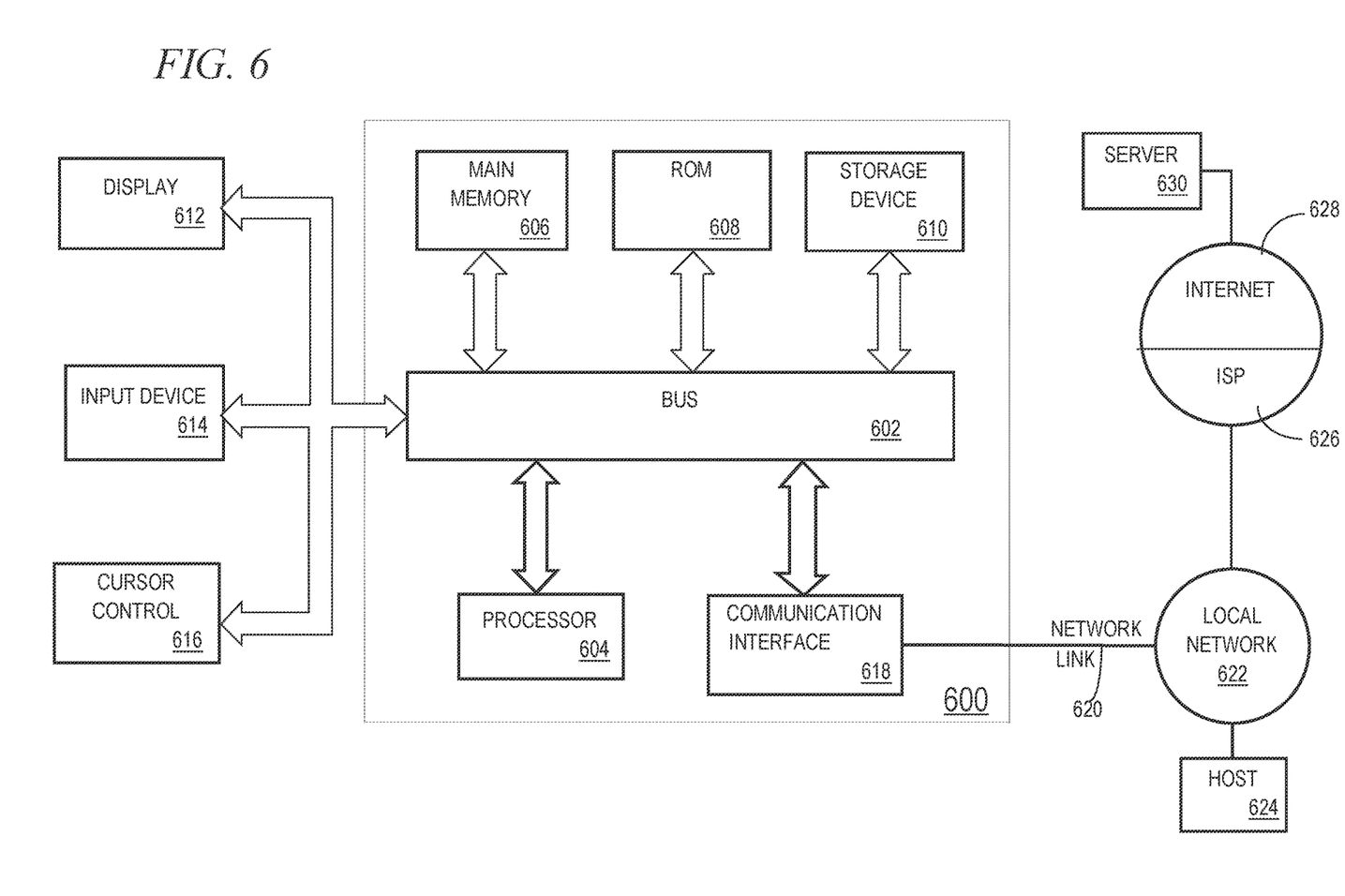
FIG. 6 is a block diagram that illustrates a computer system upon which aspects of the illustrative embodiments may be implemented.

For example, FIG. 6 is a block diagram that illustrates a computer system 600 upon which aspects of the illustrative embodiments may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
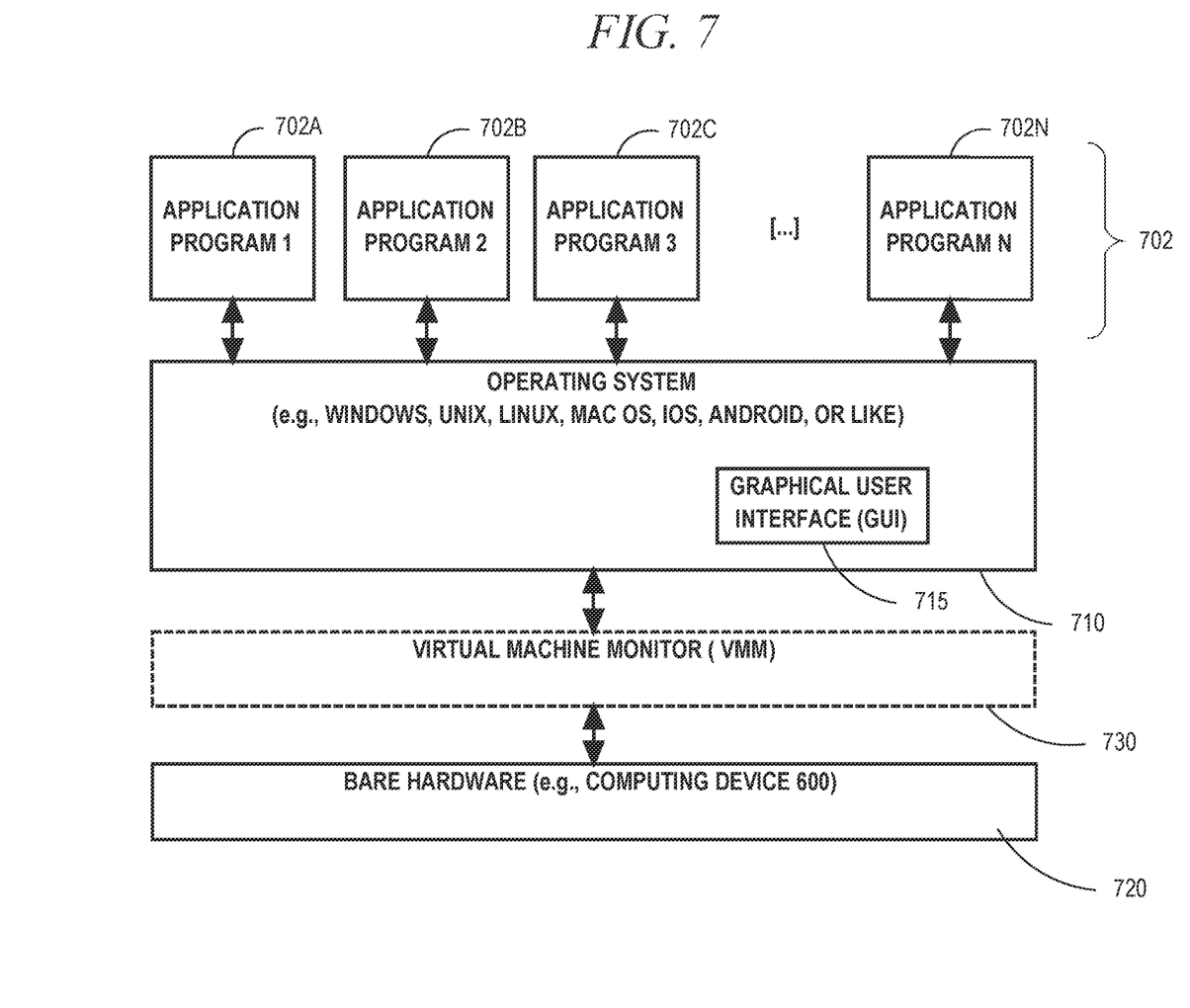
FIG. 7 is a block diagram of a basic software system that may be employed for controlling the operation of a computer system upon which aspects of the illustrative embodiments may be implemented.

FIG. 7 is a block diagram of a basic software system 700 that may be employed for controlling the operation of computer system 700 upon which aspects of the illustrative embodiments may be implemented. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, at a coordinator in a sharded database management system (DBMS), a particular query that has a first extensible markup language (XML) operator that references a column in a sharded table partitioned across a plurality of shards of the sharded DBMS, the first XML operator returning an XML image having an XML image type;
   in response to the coordinator receiving the particular query, issuing from the coordinator to each shard of the plurality of shards a remote query that uses a second XML operator that returns a transportable binary XML (TBX) binary large object (BLOB), wherein the second XML operator instructs each shard of the plurality of shards to execute the first XML operator and return to the coordinator a TBX BLOB having a transportable binary XML (TBX) type as a result of executing the first XML operator;
   receiving, by the coordinator, a plurality of TBX BLOBs from the plurality shards as a result of the plurality of shards executing the first XML operator;
   creating a plurality of XML images from the plurality of TBX BLOBs;
   returning a result of the particular query based on the plurality of XML images;
   wherein the method is performed by one or more computing devices.

2. The method of claim 1, wherein each given shard within the plurality of shards extracts a BLOB from an XML image stored at the given shard as a result of the sharded table being partitioned across the plurality of shards.

3. The method of claim 1, wherein receiving a TBX BLOB from a given shard within the plurality of shards comprises:
   creating a temporary large object;
   receiving data from the given shard; and
   writing the received data into the temporary large object.

4. The method of claim 3, wherein receiving the TBX BLOB from the given shard further comprises receiving a locator from the given shard, wherein the locator comprises an identifier of the given shard and a size of data being returned.

5. The method of claim 3, wherein creating the XML image comprises:
   responsive to all data being received from the given shard, converting the temporary large object to the TBX type.

6. The method of claim 1, wherein each created XML image has the TBX type.

7. The method of claim 1, wherein the TBX type is a self-contained XML type with inline token information.

8. The method of claim 1, wherein the first XML operator is an XML query operator.

9. The method of claim 1, wherein each shard within the plurality of shards stores a portion of the sharded table in the TBX type.

10. The method of claim 1, wherein:
    the second XML operator in the remote query references a make-XML operator, and
    creating a given XML image comprises executing the make-XML operator at the coordinator on a TBX BLOB received from a given shard.

11. One or more non-transitory storage media storing one or more sequences of instructions which, when executed by one or more computing devices, cause:
    receiving, at a coordinator in a sharded database management system (DBMS), a particular query that has a first extensible markup language (XML) operator that references a column in a sharded table partitioned across a plurality of shards of the sharded DBMS, the first XML operator returning an XML image having an XML image type;
    in response to the coordinator receiving the particular query, issuing from the coordinator to each shard of the plurality of shards a remote query that uses a second XML operator that returns a binary large object (BLOB), wherein the second XML operator instructs each shard of the plurality of shards to execute the first XML operator and return to the coordinator a TBX BLOB having a transportable binary XML (TBX) type as a result of executing the first XML operator;
    receiving, by the coordinator, a plurality of TBX BLOBs from the plurality shards as a result of the plurality of shards executing the first XML operator;
    creating a plurality of XML images from the plurality of TBX BLOBs;
    returning a result of the particular query based on the plurality of XML images.

12. The one or more non-transitory storage media of claim 11, wherein each given shard within the plurality of shards extracts a BLOB from an XML image stored at the given shard as a result of the sharded table being partitioned across the plurality of shards.

13. The one or more non-transitory storage media of claim 11, wherein receiving a TBX BLOB from a given shard within the plurality of shards comprises:
    creating a temporary large object;
    receiving data from the given shard; and
    writing the received data into the temporary large object.

14. The one or more non-transitory storage media of claim 13, wherein receiving the TBX BLOB from the given shard further comprises receiving a locator from the given shard, wherein the locator comprises an identifier of the given shard and a size of data being returned.

15. The one or more non-transitory storage media of claim 13, wherein creating the XML image comprises:
    responsive to all data being received from the given shard, converting the temporary large object to the TBX type.

16. The one or more non-transitory storage media of claim 11, wherein each created XML image has the TBX type.

17. The one or more non-transitory storage media of claim 11, wherein the TBX type is a self-contained XML type with inline token information.

18. The one or more non-transitory storage media of claim 11, wherein the first XML operator is an XML query operator.

19. The one or more non-transitory storage media of claim 11, wherein each shard within the plurality of shards stores a portion of the sharded table in the TBX type.

20. The one or more non-transitory storage media of claim 11, wherein:
   the second XML operator in the remote query references a make-XML operator, and
   creating a given XML image comprises executing the make-XML operator at the coordinator on a TBX BLOB received from a given shard.

\* \* \* \* \*